United States Patent
Li et al.

(10) Patent No.: US 7,920,469 B2
(45) Date of Patent: Apr. 5, 2011

(54) INDICATING A VARIABLE CONTROL CHANNEL STRUCTURE FOR TRANSMISSIONS IN A CELLULAR SYSTEM

(75) Inventors: Shupeng Li, Edison, NJ (US); Shirish Nagaraj, Cedar Knolls, NJ (US); Sudhir Ramakrishna, New York, NJ (US); Ashok N. Rudrapatna, Basking Ridge, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 489 days.

(21) Appl. No.: 11/424,352

(22) Filed: Jun. 15, 2006

(65) Prior Publication Data

US 2007/0293171 A1  Dec. 20, 2007

(51) Int. Cl.
*H04L 12/26* (2006.01)

(52) U.S. Cl. ............ 370/230; 370/335; 455/185.1; 455/187.1

(58) Field of Classification Search ........... 455/185.1, 455/187.1, 133; 375/146, 147; 370/230, 370/335, 342, 310
See application file for complete search history.

(56) References Cited

U.S. PATENT DOCUMENTS

| | | | | |
|---|---|---|---|---|
| 5,509,020 A * | 4/1996 | Iwakiri et al. | | 714/704 |
| 5,901,160 A * | 5/1999 | Abe et al. | | 714/774 |
| 6,195,327 B1 * | 2/2001 | Lysejko et al. | | 370/201 |
| 6,934,275 B1 * | 8/2005 | Love et al. | | 370/342 |
| 7,158,482 B2 * | 1/2007 | Love et al. | | 370/252 |
| 7,359,430 B2 * | 4/2008 | McDonough et al. | | 375/147 |
| 2003/0114109 A1 * | 6/2003 | Thayer et al. | | 455/66 |
| 2005/0259613 A1 * | 11/2005 | Garudadri et al. | | 370/328 |
| 2006/0203731 A1 * | 9/2006 | Tiedemann et al. | | 370/235 |
| 2006/0256862 A1 * | 11/2006 | Rao et al. | | 375/240.08 |

OTHER PUBLICATIONS

PCT International Search Report PCT/US2007/013520 Jun. 3, 2008.
Written Opinion PCT International Search Report Sep. 3, 2008.
Ratasuk R. et al., "Power Control of the High Speed Shared Control Channel" *Vehicular Technology Conference*, 2005, VTC-2005-FALL, 2005 *IEEE* 62 $^{nd}$ Dallas, Texas USA Sep. 25-28, 2005, Piscataway, NJ. USA *IEEE*, (Sep. 25, 2005) pp. 2449-2453, XP010878892, ISBN: 0-7803-9152-7.
"High Speed Downlink Packet Access: Physical Layer Aspects (Release 5)" *3 GPP TR* 25.858 V5.0.0, (Mar. 2002), pp. 1-31, XP002265002.

* cited by examiner

*Primary Examiner* — Congvan Tran
(74) *Attorney, Agent, or Firm* — Williams, Morgan & Amerson (57) ABSTRACT

A method and an apparatus for wireless communication between a receiver and a transmitter in a cellular system are provided. The method comprises associating a channel of known structure at the transmitter with the transmission of a first control channel to indicate a variable structure of the first control channel to the receiver.

19 Claims, 3 Drawing Sheets

INDICATING A VARIABLE CONTROL CHANNEL STRUCTURE FOR TRANSMISSIONS IN A CELLULAR SYSTEM

FIELD OF THE INVENTION

This invention relates generally to telecommunications, and more particularly, to wireless communications.

DESCRIPTION OF THE RELATED ART

Wireless communications systems or mobile telecommunication systems typically provide different types of services to various users or subscribers of wireless communication devices. The wireless communication devices may be mobile or fixed units and situated within a geographic region across one or more wireless networks. The users or subscribers of wireless communication devices, such as mobile stations (MSs) or access terminals or user equipment may constantly move within (and outside) particular wireless networks.

A wireless communications system generally includes one or more base stations (BSs) that can establish wireless communications links with mobile stations. Base stations may also be referred to as node-Bs or access networks. To form the wireless communications link between a mobile station and a base station, the mobile station accesses a list of available channels/carriers broadcast by the base station. To this end, a wireless communications system, such as a spread spectrum wireless communications system, may allow multiple users to transmit simultaneously within the same wideband radio channel, enabling a frequency re-use scheme based on a spread spectrum technique.

Many cellular systems, for example, spread-spectrum cellular systems use a Code division multiple access (CDMA) protocol, transmit data in a wireless network consistent with a desired standard, such as IS-95, CDMA2000 or Universal Mobile Telecommunication System (UMTS) based wideband-CDMA (WCDMA). A spread-spectrum cellular system generally provides transmissions associated with one or more mobile stations that a base station may be serving on the downlink (a.k.a. forward link (FL)). As such, transmissions from mobile stations to a single sector (base station) may occur on the uplink (a.k.a. reverse link (RL)).

To establish a wireless communication in a cellular system, a base station (BS) schedules the transmissions of the various mobile stations (MSs) that it is serving on the MS-to-BS (reverse link (RL)). To this end, the base station may send commands to the mobile stations on the BS-to-MS link (forward link (FL)). For example, in a particular cellular system, the mobile stations may use time units based radio access, which are commonly referred to as time slots, to transmit on the reverse link (RL) to the base station. The time slots are usually quasi-synchronized (e.g., approximately at the slot boundaries) across the mobile stations (MSs) and base station (BSs).

In a cellular system, wherein the base stations (BSs) and mobile stations (MSs) communicate with each other over an air interface, each BS controls a set of MSs, communicates with a set of MSs on the forward link and listens to the communications from a set of MSs on the reverse link. Generally, for a bi-directional data flow, the BS and MS can be both the transmitter and receiver of data. To aid the bi-directional data flow between the transmitter and receiver, the cellular system uses an associated flow of link control information. Such link control information may be carried in messages over the air interface, in the form of encoder packets (EPs). An EP is a set of bits, formed from the (control information) payload bits as follows.

a) A coding scheme, wherein each input payload bit is transformed using a coding rule to several code bits, may be used to add redundancy.

b) Additional bits allowing the receiver to know if the EP payload was decoded correctly may be added.

To receive a control message (e.g., the payload bits in the control EP), a receiver demodulates and decodes the EP. This process requires the receiver to have knowledge about the size and structure of the EP, i.e., about the number of payload and error detection bits, and the coding and modulation scheme, among others.

However, the structure of the EP may be changed unpredictably and autonomously by the transmitter, depending on the nature of the control information being conveyed. Also, in general, other factors remaining the same, a smaller payload requires lesser transmit power to guarantee reliable reception than a larger one. Hence, to minimize the transmit power, the cellular system forms the control message payload as small as possible, for example, by transmitting only necessary information, for which there is an update since the last time such a control message was sent. Thus, for a resource request message, an MS may not transmit the buffer status information if there has been no change in the buffer status since the last resource request message. Likewise, other parameters in the control message may be similarly handled. Accordingly, the receiver may not know of a change in the EP structure of the transmitted control EP and cannot accommodate the change in the control EP structure.

One technique pre-defines the structure of the control EP and the modulation scheme to be used to transmit it, assuming that all of the control information is always transmitted. In other words, a fixed set of parameters that forms the (hence fixed size) payload of a control message is defined, which are then always transmitted, along with a fixed coding and modulation scheme, which are always used. In this approach, the receiver has no ambiguity about the structure of the control transmissions, and hence can always receive it. However, as explained before, such a mechanism is wasteful of transmit resources since it does not allow one to transmit only what is required.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present invention is directed to overcoming, or at least reducing, the effects of, one or more of the problems set forth above.

In one embodiment of the present invention, a method of wireless communication between a receiver and a transmitter in a cellular system is provided. The method comprises associating a channel of known structure at the transmitter with the transmission of a first control channel to indicate a variable structure of the first control channel to the receiver.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it should be appreciated that such a development effort might be complex and time-consuming, but may nevertheless be a routine undertaking for those of ordinary skill in the art having the benefit of this disclosure.

Generally, a method and an apparatus for a wireless communication between a receiver and a transmitter, for example, between at least one mobile station and a base station are provided in a cellular system. The method comprises associating a channel of known structure at the transmitter with the transmission of a first control channel to indicate a variable structure of the first control channel to the receiver. By enabling a transmitter to signal the structure of the control channel "on the fly" to a receiver, the structure of the control channel may be tailored to the payload to be transmitted on the control channel. By transmitting another channel, referred to as a pointer channel, along with the control channel, the flexibility of a variable-structure of the control channel may be maintained. The structure of the pointer channel is fixed and known to both transmitter and receiver, and the payload of this pointer channel is the structure of the accompanying control channel. Use of the pointer channel may enable a transmitter to size one or more transmission resources used for control channels according to the payload to be transmitted. Such use of the transmission resources may significantly improve the efficiency of a cellular system. A protocol may be deployed at both the transmitter and the receiver to indicate use of the pointer channel. Instead of using a control channel with a fixed structure that supports a certain fixed maximum payload size, causing the transmitter to transmit the full payload all the time, even if some of the information was redundant or unnecessary the control channel with a variable structure may avoid wasting transmit power and/or bandwidth resources. That is, the control channel may be sized according to a control payload to be transmitted. Hence, the transmission resources (power and/or bandwidth) used for transmission of the control channel may be sized based on the control payload, thus increasing the efficiency of the cellular system. Since the pointer channel is used with the control channel, a fixed control channel structure that pays a price in terms of control channel transmission efficiency may be avoided.

Figure 1:
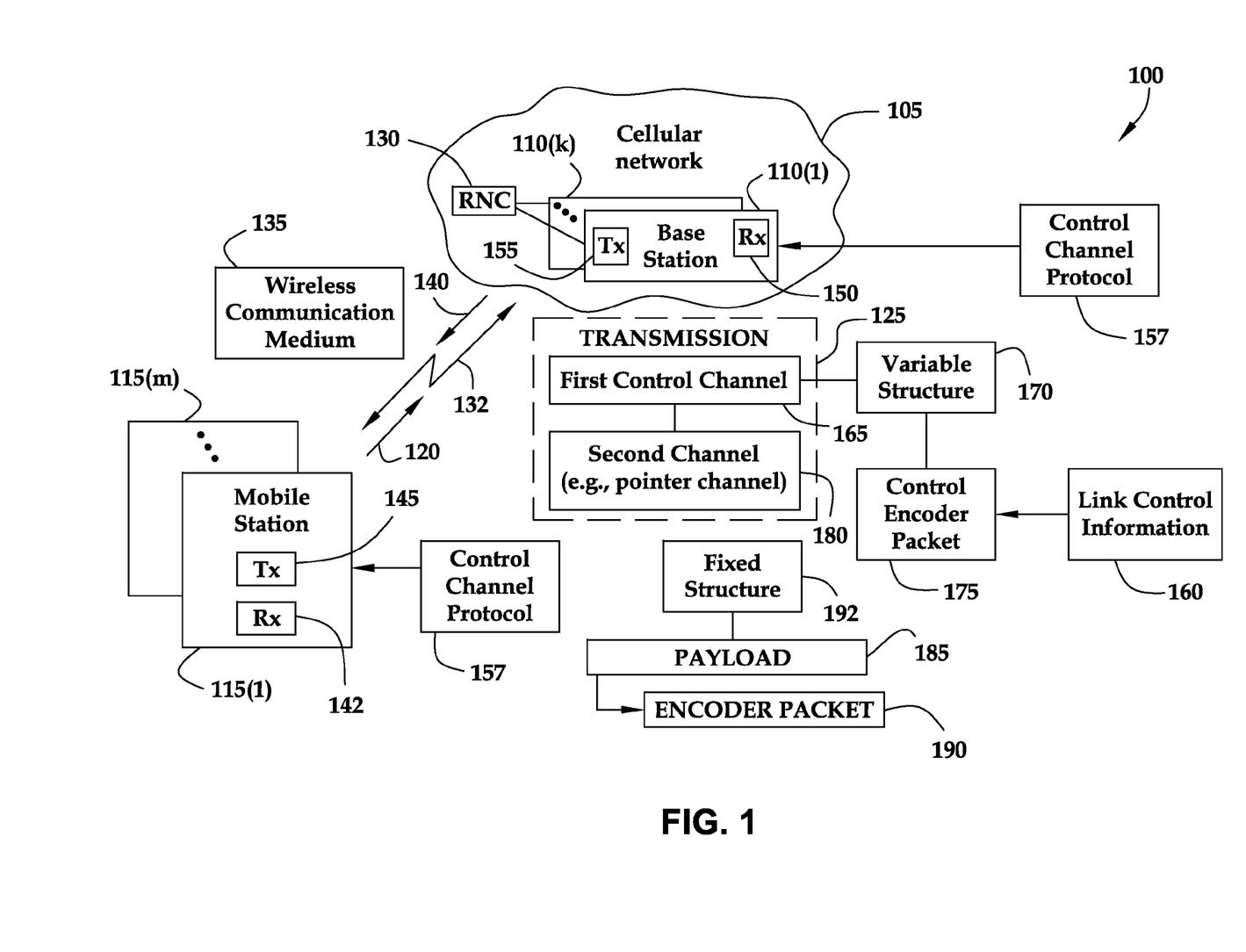
FIG. 1 schematically depicts a cellular system, which enables a transmitter to signal the variable structure of the control channel "on the fly" to a receiver, according to one illustrative embodiment of the present invention.

Referring to FIG. 1, a cellular system 100 is illustrated to include a wireless network, such as a cellular network 105 that connects a set of base stations (BSs) 110 (1-$k$) and a plurality of mobile stations (MSs) 115 (1-$m$) for controlling link control transmissions according to one illustrative embodiment of the present invention. For a wireless communication between at least one mobile station 115(1) and a base station 110(1), one channel of known structure may be associated with the transmission 125 of another control channel at a transmitting end to indicate a variable control channel structure thereof at a receiving end.

The set of base stations 110 (1-$k$) may provide the wireless connectivity to at least one mobile station 115 (1) according to any desirable protocol. Examples of a protocol include a code division multiple access (CDMA, CDMA2000) protocol, wideband-CDMA (WCDMA) protocol, a Universal Mobile Telecommunication System (UMTS) protocol, a Global System for Mobile communications (GSM) protocol, and like.

Examples of the mobile stations 115 (1-$m$) may include a host of wireless communication devices including, but not limited to, cellular telephones, personal digital assistants (PDAs), and global positioning systems (GPS) that employ the cellular system 100 to operate in a high-speed wireless data network, such as a digital cellular CDMA network. Other examples of the mobile stations 115 (1-$m$) may include smart phones, text messaging devices, and the like.

In the cellular system 100, mobile communications that communicate messages between the set of base stations 110 (1-$k$) and each mobile stations 115 (1-$m$) may occur over an air interface 132 via a wireless communication medium 135, such as a radio frequency (RF) channel that uses a code division multiple access (CDMA) protocol. Although not shown, the wireless communication medium 135 may include any intermediate devices that facilitate wireless communication between the mobile stations 115 (1-$m$) and the set of base stations 110 (1-$k$). For example, the wireless communication medium 135 may use a variety of repeaters, antennas, routers, and any desirable communication or network component capable of providing wireless communication. Each mobile station 115 (1-$m$) may further communicate with the set of base stations 110 (1-$k$) using an uplink (reverse link (RL)) 120 over the wireless communication medium 135. Conversely, the set of base stations 110(1-$k$) may use a downlink (forward link (FL)) 140 over the wireless communication medium 135.

A radio network controller 130 may coordinate a handover of mobile communications upon a user leaving an area of responsibility of one base station 110(1), into another base station 110($k$). That is, a handover of mobile communications occurs for the mobile station 115(1) when responsibility of communication switches from a first cell sector served by the base station 110(1) to a second cell sector served by the other base station 110($k$).

According to one illustrative embodiment of the present invention, the cellular system 100 may include a frame selector unit (FSU) connected to both the base stations, comparing the frames received by the base stations 110(1) and 110($k$) to identify the better frame. This makes it possible for two (or more) base stations of the set of base stations 110(1-$k$) to seamlessly support the mobile stations 115(1-$m$).

To communicate with different base stations 110(1-$k$), the mobile station 115(1) may comprise a receiver (RX) 142 and a transmitter (TX) 145. While the receiver 142 may receive transmissions of packet data from the set of base stations 110(1-$k$), the transmitter 145 may transmit packet data in transmission 125. The transmission 125 may comprise packet data to the base station 110(1) that may be associated with a cell sector of a base station.

The base station 110(1) may comprise a receiver (RX) 150 and a transmitter (TX) 155 in one embodiment of the present invention. While the receiver 150 may receive the transmission 125 of packet data from the mobile stations 115(1-$m$), the transmitter 155 may transmit packet data and signaling messages when the base station 110(1) may serve the mobile station 115(1) on the uplink 120. In one embodiment, the mobile station 115(1) may use a code division multiple access (CDMA) protocol to communicate on the uplink 120.

In the cellular system 100, as described above, the transmitter 145 at the mobile station 115(1) may transmit link control information 160 to the receiver 150 at the base station 110(1) for controlling the transmission 125 over the uplink 120. In the cellular system 100, an associated flow of the link control information 160 to the transmission 125 may aid the data flow between the transmitter 145 and the receiver 150. The following are examples of the link control information 160 flow that may be used in the embodiments discussed below:

1. On the uplink or reverse link (RL) 120, the mobile station (MS) 115(1) may transmit a resource request message to the base station (BS) 110(1). Such a message may comprise a buffer status of the mobile station 115(1), the amount of transmit power available to the mobile station 115(1), and a request for a grant of a certain bandwidth resource for a certain time.

2. On the downlink or forward link (FL) 140, the base station 110(1) may send a resource grant message to the mobile station 115(1) (e.g., in response to a resource request message). Such a message may instruct the mobile station 115(1) to start its data transmission (on the RL 120) at a certain time, using certain specified resources, and transmit for a certain time.

3. On the uplink or reverse link (RL) 120, the mobile station 115(1) may report some forward link (FL) 140 channel quality measurements to the base station 110(1). Such measurements may be used by the base station 110(1) to fine-tune its forward link (FL) 140 transmissions to that mobile station 115(1).

In some embodiments, the link control information 160 messages may be carried over the air interface 132, in the form of encoder packets (EPs). An EP is a set of bits, formed from the (control information) payload bits using a coding scheme, wherein each input payload bit is transformed using some coding rule to several code bits to add redundancy. Also, some additional bits allowing the receiver 150 to know if the EP payload was decoded correctly may be added.

A desired modulation scheme may then be used to convert the EP bits into symbols for the transmission 125 over the air interface 132. Examples of the modulation schemes include binary phase shift keying (BPSK), quaternary phase shift keying (QPSK), and quadrature amplitude modulation (QAM). These symbols are then transmitted over the air interface 132. The transmission of an EP may occur over time durations referred to as transmission time intervals (TTIs) that may be pre-defined.

To transmit the link control information 160 between the transmitter 145 and the receiver 150, the mobile station 115 (1) may use a first control channel 165 with a variable structure 170. In one embodiment, the variable structure 170 may include the encoder packet (EP) size, coding and modulation used, physical air interface resources used and any other characteristic distinguishing the first control channel 165 from other channels.

The first control channel 165 may transmit the link control information 160 in a control encoder packet (CEP) 175. A separate channel, such as a second channel 180 referred to as the pointer channel, may be transmitted simultaneously along with the first control channel 165 carrying the link control information 160. Here, the term "separate" implies that the second or pointer channel 180 may be received separately and independently (from the first control channel 165) at the receiver 150.

A control channel protocol 157 may be deployed at both the transmitter 145 and the receiver 150 to indicate use of the second channel 180. The second channel 180 may carry a payload 185 in an encoder packet (EP) 190 to indicate the variable structure 170 of the first control channel 165. In particular, the payload 185 of the second channel 180 may include information about the variable structure 170 and one or more transmission characteristics of the first control channel 165. This information in the payload 185 may indicate such characteristics of the first control channel 165 that may enable the receiver 150 to receive and process the first control channel 165 at the receiver 150. For example, the information in the payload 185 may include the control information, EP size, the coding scheme and modulation used in the first control channel 165, the physical air interface resources used and such characteristics, which may distinguish the first control channel 165 from other channels.

By using the second channel 180 with a fixed structure 192 that may support a desired fixed maximum payload size, the transmitter 145 may transmit a portion of the payload 185 when other information may be redundant or un-necessary. That is, the first control channel 165 with the variable structure 170 may efficiently indicate use of the transmit power and/or bandwidth resources. In other words, the first control channel 165 may be sized based on a control payload, i.e., the link control information 160 to be transmitted. Accordingly, the transmission resources (power/bandwidth) used for the transmission 125 of the first control channel 165 may be sized based on the control payload, thus increasing the efficiency of the cellular system 100. Since the second channel 180 is used with first the control channel 165, the variable structure 170 of the first control channel 165 may avoid paying a price in terms of control channel transmission efficiency.

In one embodiment, the fixed structure 192 of the second channel 180 may be pre-determined. In one embodiment, the fixed structure 192 may include the encoder packet (EP) 190 size, coding and modulation used, physical air interface resources used and any other characteristic distinguishing the second channel 180 from other channels. Using the control channel protocol 157, the cellular system 100 may indicate the fixed structure 192 of the second channel 180 to both the transmitter 145 and the receiver 150.

The receiver 150 may sequentially process (i.e., demodulate and/or decode, and then interpret the payload 185 of) the second channel 180 and the first control channel 165. In this manner, the receiver 150 may first process the second channel 180, which yields the variable structure 170 of the first control channel 165, enabling the receiver 150 to next process the first control channel 165.

Consistent with one embodiment of the instant invention, in the cellular system 100, the air interface 132 may be based on a code division multiple access (CDMA) protocol. Accordingly, various channels including the first control channel 165 and the second channel 180 may be transmitted over the same bandwidth, but are distinguished by the use of separate orthogonal (e.g., Walsh) spreading codes. Since both the transmitter 145 and receiver 150 know of a code used for the second channel 180, by using two separate Walsh codes, the transmitter 145 may transmit the first control and second channels 165, 180 simultaneously. Moreover, the encoder packet (EP) 190 being carried by the second channel 180 may include information about the Walsh code being used by the first control channel 165. The receiver 150 may first process (e.g., demodulate and/or decode and interpret) the EP 190 of the second channel 180 to obtain the information desired to process the control encoder packet (CEP) 175 transmitted on the first control channel 165.

In accordance with one exemplary embodiment of the cellular system 100 in which an orthogonal frequency division multiplexing (OFDM) may be used for the air interface 132, various channels including the first control channel 165 and the second channel 180 may be transmitted on orthogonal subsets of the available bandwidth. The cellular system 100 may divide the total bandwidth into a number of sub-carriers, each of which occupy a different narrow portion of the total bandwidth, and each of which thus becomes orthogonal to any other sub-carrier. Since the transmitter 145 may transmit various channels on subsets of sub-carriers, the first control and second channels 165, 180 may be transmitted simultaneously, on different subsets of sub-carriers.

Although the sub-carriers on which the second channel 180 may be transmitted may be pre-determined, the control channel protocol 157 may cause such sub-carriers to be known to both the transmitter 145 and receiver 150 along with the fixed structure 192 of the second channel 180. Additionally, the EP 190 being carried by the second channel 180 may comprise information about the sub-carriers being used to transmit the first control channel 165. In this way, the receiver 150 may first receive and process the second channel 180, which in turn, enables the receiver 150 to next receive and process the first control channel 165.

Each mobile station 115 may transmit traffic packets, such as data packets in the transmissions 125. Often the traffic packets include information that is intended for a particular user of a mobile station 115. For example, traffic packets may include voice information, images, video, data requested from an Internet site, and the like.

In the cellular system 100, a wireless network, such as the cellular network 105 may deploy any desirable protocol to enable wireless communications between the base stations 110(1-$k$) and the mobile stations 115(1-$m$) according to any desirable protocol. Examples of such a protocol include a (CDMA, WCDMA) protocol, a UMTS protocol, a GSM protocol, and like. The radio network controller (RNC) 130 may be coupled to the base stations 110(1) and 110($k$) to enable a user of the mobile station 115(1) to communicate packet data over a network, such as a cellular network. One example of the cellular network includes a digital cellular network based on a CDMA protocol, such as specified by the 3rd Generation (3G) Partnership Project (3GPP) specifications.

Other examples of such a protocol include a WCMDA protocol, a UMTS protocol, a GSM protocol, and like. The radio network controller 130 may manage exchange of wireless communications between the mobile stations 115(1-$m$) and the base stations 110(1-$k$) according to one illustrative embodiment of the present invention. Although two base stations 110(1-$k$) and one radio network controller 130 are shown in FIG. 1, persons of ordinary skill in the pertinent art having benefit of the present disclosure should appreciate that any desirable number of base stations 110 and radio network controllers 130 may be used.

Each of the base stations 110(1-$k$), sometimes referred to as Node-Bs, may provide connectivity to associated geographical areas within a wireless data network. Persons of ordinary skill in the art should appreciate that portions of such a wireless data network may be suitably implemented in any number of ways to include other components using hardware, software, or a combination thereof. Wireless data networks are known to persons of ordinary skill in the art and so, in the interest of clarity, only those aspects of a wireless data network that are relevant to the present invention will be described herein.

According to one embodiment, each mobile station 115 may communicate with an active base station 110 on the uplink 120 via the radio network controller 130 coupled to the first and second base stations 110(1-$k$). Each mobile station 115 may communicate over the uplink 120 with the active base station, which is generally referred to as the serving base station or the serving sector. The 3rd Generation Partnership Project (3GPP) standard defines the role of a serving base station or a serving sector and a serving radio network controller based on 3GPP specifications.

In one embodiment, the uplink 120 and the downlink 140 may be established on a plurality of channels. The channels, such as traffic and control channels may be associated with separate channel frequencies. For example, CDMA channels with associated channel number and frequency may form a wireless communication link for transmission of high-rate packet data. On the downlink 140, for example, the mobile stations 115(1-$m$) may update the base station 110(1) with a data rate to receive transmissions on a Forward Traffic Channel or a Forward Control Channel. The Traffic Channel carries user data packets. The Control Channel carries control messages, and it may also carry user traffic. The downlink 140 may use a Forward MAC Channel that includes four sub-channels including a Reverse Power Control (RPC) Channel, a Data Rate Control Lock (DRCLock) Channel, ACK channel and a Reverse Activity (RA) Channel.

On the uplink 120, the mobile station 115(1) may transmit on an Access Channel or a Traffic Channel. The Access Channel includes a Pilot Channel and a Data Channel. The Traffic Channel includes Pilot, MAC and Data Channels. The MAC Channel comprises four sub-channels including a Reverse Rate Indicator (RRI) sub-channel that is used to indicate whether the Data Channel is being transmitted on the Reverse Traffic Channel and the data rate. Another sub-channel is a Data Rate Control (DRC) that is used by the mobile station 115(1) to indicate to the first base station 110(1) a data rate that the Forward Traffic Channel may support on the best serving sector. An acknowledgement (ACK) sub-channel is used by the mobile station 115(1) to inform the base station 110(1) whether the data packet transmitted on the Forward Traffic Channel has been received successfully. A Data Source Control (DSC) sub-channel is used to indicate which of the base station sectors should be transmitting forward link data.

In another embodiment, the mobile station 115(1) may provide the transmission 125 of packet data, as shown in FIG. 1, to at least two cell sectors associated with one or more of a set of base stations 110(1-$k$). In one embodiment, the spread-spectrum cellular system 100 may be based on a cellular network, which at least in part, may be based on a Universal Mobile Telecommunications System (UMTS) standard. The cellular network may be related to any one of the 2G, 3G, or 4G standards that employ any one of the protocols including the UMTS, CDMA2000, or the like, however, use of a particular standard or a specific protocol is a matter of design choice and not necessarily material to the present invention.

In one embodiment, a conventional Open Systems Interconnection (OSI) model may enable transmission of the packet data and other data including messages, packets, datagram, frames, and the like between the mobile station 115(1) and the set of base stations 110(1-k). The term "packet data" may include information or media content that has been arranged in a desired manner. The packet data may be transmitted as frames including, but not limited to, a radio link protocol (RLP) frame, signaling link protocol (SLP) frame or any other desired format. Examples of the packet data may include a payload data packet representative of voice, video, signaling, media content, or any other type of information based on a specific application.

Figure 2:
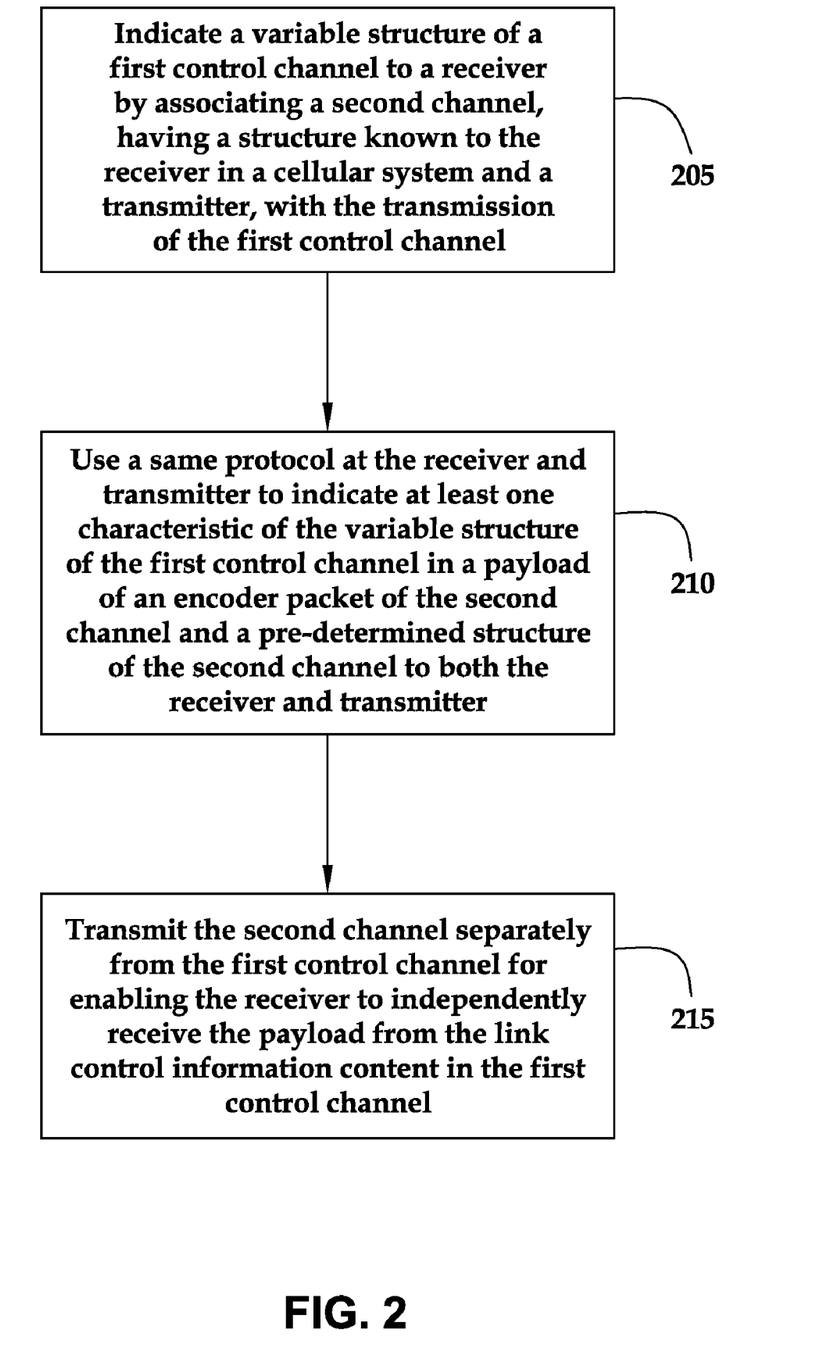
FIG. 2 illustrates a stylized representation for implementing a method of indicating the variable structure of a first control channel in the transmission on the uplink from the transmitter by using a second channel of known structure in accordance with one embodiment of the present invention.

Turning now to FIG. 2, a stylized representation for implementing a method of indicating the variable structure 170 of the first control channel 165 in the transmission 125 on the uplink 120 is illustrated by using the second channel 180 of known structure in accordance with one embodiment of the present invention. By accompanying the second channel 180 with the first control channel 165, the method provides an indication of at least one characteristic of the variable structure 170 to the receiver 150. For example, to simultaneously transmit the second channel 180 with the first control channel 165, the mobile station 115(1) may use a code division multiple access (CDMA) protocol in the transmission 125.

Accordingly, at block 205, the mobile station 115(1) may enable the transmitter 145 to indicate the variable structure 170 of the first control channel 165 to the receiver 150 by associating the second channel 180, having the fixed structure 180 known to both the receiver 150 and the transmitter 145 in the cellular system 100, with the transmission of the first control channel. At block 210, the receiver 150 may use the same control channel protocol 157 as the transmitter 145 uses to indicate at least one characteristic of the variable structure 170 of the first control structure in the payload 185 of the encoder packet 190 of the second channel 180. In addition, the control channel protocol 157 may enable use of a predetermined structure of the second channel 180, such as the pointer channel at both the receiver 150 and the transmitter 145.

At block 215, the transmitter 145 may transmit the second channel 180 separately from the first control channel 165 for enabling the receiver 150 to independently receive the payload 185 from the link control information 160 content in the first control channel 165. The receiver 150 to receive a control message (the payload bits in the control EP 175) may demodulate and decode the EP 190 and the control EP 175. The receiver 150 may use knowledge about the size and structure of the control EP 175, e.g., about the number of payload and error detection bits, and the coding and modulation scheme, among others from the EP 190.

Figure 3:
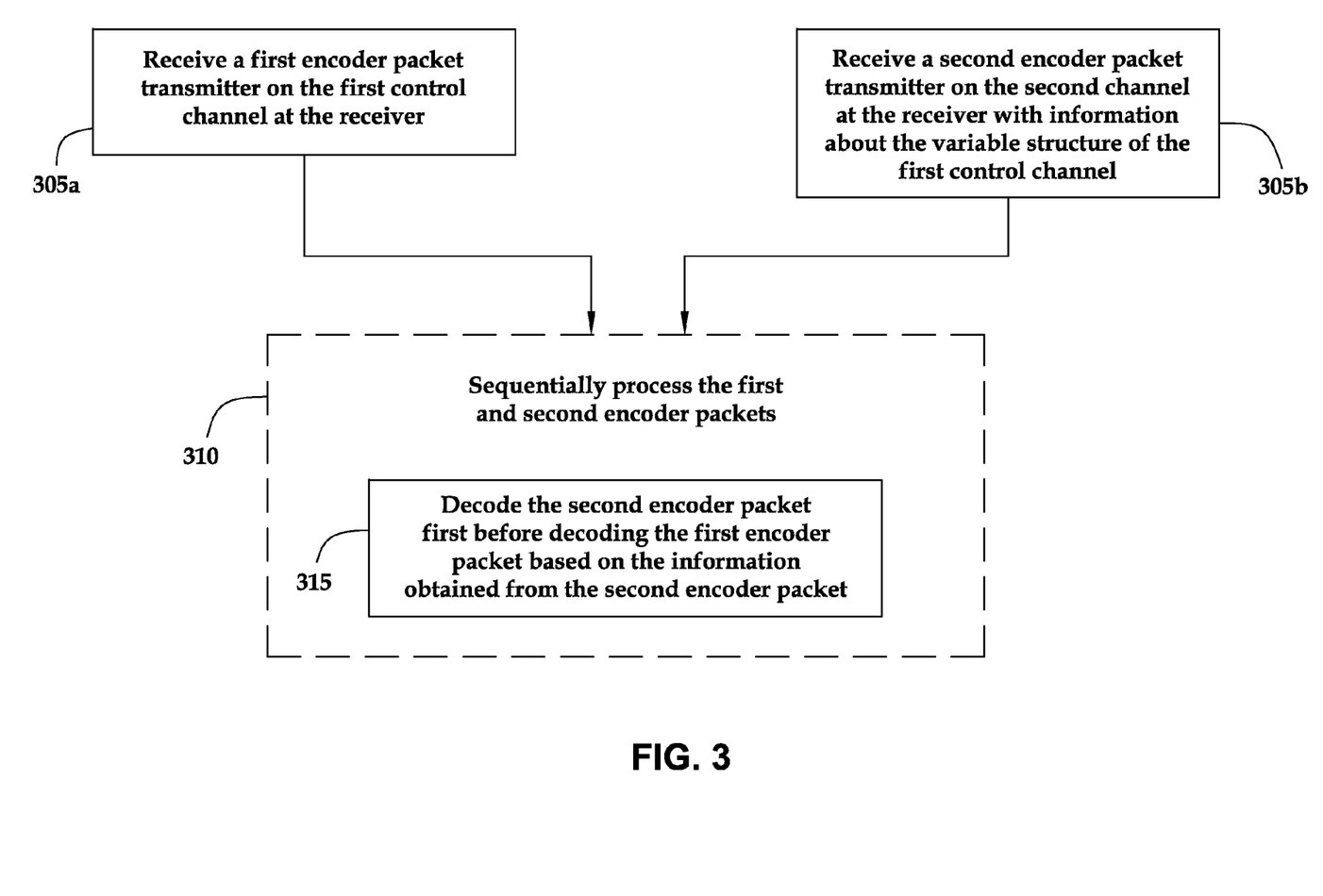
FIG. 3 illustrates a stylized representation for implementing a method of receiving the transmission including the first control channel and the second channel on the uplink by the receiver of the base station 110(1), in accordance with one illustrative embodiment of the present invention.

Referring to FIG. 3, a stylized representation for implementing a method of receiving the transmission 125 including the first control channel 165 and the second channel 180 on the uplink 120 by the receiver 150 of the base station 110(1) is illustrated in accordance with one embodiment of the present invention. At block 305a, the receiver 150 may receive a first encoder packer, i.e., the control encoder packet 175 transmitted on the first control channel 165 from the transmitter 145. Likewise, at block 305b, the receiver 150 may receive a second encoder packer, i.e., the encoder packet (EP) 190 transmitted on the second channel 180 from the transmitter 145. Upon receiving the control encoder packet 175 and the encoder packet 190, the receiver 150 may sequentially process both the EP packets, as indicated at block 310. In particular, as shown in block 315, the receiver 150 at the base station 110(1) may decode the EP 190 first before decoding the control EP (CEP) 175 based on the information obtained from the EP 190 about the variable structure 170 of the first control channel 165.

In one embodiment, the cellular system 100 may wirelessly communicate mobile data at a speed and coverage desired by individual users or enterprises. According to one embodiment, the high-speed wireless data network may comprise one or more data networks, such as Internet Protocol (IP) network comprising the Internet and a public telephone system (PSTN). The 3rd generation (3G) mobile communication system, namely Universal Mobile Telecommunication System (UMTS) supports multimedia services according to 3rd Generation Partnership Project (3GPP2) specifications. The UMTS, also referred to as Wideband Code Division Multiple Access (WCDMA), includes Core Networks (CN) that are packet switched networks, e.g., IP-based networks. Because of the merging of Internet and mobile applications, the UMTS users can access both telecommunications and Internet resources. To provide an end-to-end service to users, a UMTS network may deploy a UMTS bearer service layered architecture specified by Third Generation Project Partnership (3GPP2) standard. The provision of the end-to-end service is conveyed over several networks and realized by the interaction of the protocol layers.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method comprising:
transmitting, from a transmitter, a first channel carrying a first encoder packet of known structure concurrently with transmitting, from said transmitter, a second channel carrying a second encoder packet having a variable structure, wherein the first encoder packet comprises a payload indicating said variable structure so that a receiver can determine the variable structure of the second encoder packet carried by the second channel using information conveyed in the payload.

2. A method, as set forth in claim 1, wherein transmitting the first encoder packet over the first channel comprises transmitting the first encoder packet over a pointer channel.

3. A method of wireless communication between a receiver and a transmitter in a cellular system, the method comprising:
transmitting, from said transmitter, a first channel carrying a first encoder packet of known structure and a second channel carrying a second encoder packet having a variable structure to said receiver so that said receiver can determine the variable structure of the second encoder packet carried by the second channel using information conveyed over the first channel in the first encoder packet, wherein transmitting the first encoder packet over the first channel comprises transmitting the first encoder packet over the first channel concurrently with transmitting the second encoder packet over the second channel, and wherein transmitting the first encoder packet over the first channel comprises indicating said variable structure of the second encoder packet transmitted over said second channel in a payload of the first encoder packet transmitted over a pointer channel, and wherein indicating said variable structure of the second encoder packet transmitted over said second channel comprises transmitting an indication of said variable structure in the first encoder packet transmitted over said first channel concurrently with transmitting the second encoder packet over said second channel, wherein the second encoder packet carries link control information.

4. A method of wireless communication between a receiver and a transmitter in a cellular system, the method comprising:
transmitting, from said transmitter, a first channel carrying a first encoder packet of known structure and a second channel carrying a second encoder packet having a variable structure to said receiver so that said receiver can determine the variable structure of the second encoder packet carried by the second channel using information conveyed over the first channel in the first encoder packet, wherein transmitting the first encoder packet over the first channel comprises transmitting the first encoder packet over the first channel concurrently with transmitting the second encoder packet over the second channel, and wherein transmitting the first encoder packet over the first channel comprises indicating said variable structure of the second encoder packet transmitted over said second channel in a payload of the first encoder packet transmitted over a pointer channel, and further comprising:
using at least one channel characteristic to distinguish the structure of said first channel from other channels including said second channel, wherein the structure of the first channel is determined by the structure of the first encoder packet.

5. A method of wireless communication between a receiver and a transmitter in a cellular system, the method comprising:

transmitting, from said transmitter, a first channel carrying a first encoder packet of known structure and a second channel carrying a second encoder packet having a variable structure to said receiver so that said receiver can determine the variable structure of the second encoder packet carried by the second channel using information conveyed over the first channel in the first encoder packet, wherein transmitting the first encoder packet over the first channel comprises transmitting the first encoder packet over the first channel concurrently with transmitting the second encoder packet over the second channel, and wherein transmitting the first encoder packet over the first channel comprises indicating said variable structure of the second encoder packet transmitted over said second channel in a payload of the first encoder packet transmitted over a pointer channel, and further comprising:

transmitting the first encoder packet over said first channel separately from transmitting the second encoder packet over said second channel for enabling said receiver to independently receive said payload.

6. A method, as set forth in claim 5, wherein transmitting the first encoder packet over said first channel further comprises:

sending said payload in a first encoder packet of a pointer channel for carrying link control information regarding the variable structure of the second encoder packet and at least one transmission characteristic of said second channel.

7. A method, as set forth in claim 6, wherein sending said payload in the first encoder packet further comprises:

including information indicating a coding scheme for said second encoder packet, and a modulation technique used with at least one physical interface resource for said second channel.

8. A method, as set forth in claim 7, further comprising:

causing said receiver to sequentially process said first channel before said second channel.

9. A method, as set forth in claim 5, wherein transmitting the first encoder packet over said first channel further comprises:

using at least two separate Walsh codes to concurrently transmit said first channel and said second channel based on a code division multiple access protocol.

10. A method, as set forth in claim 9, further comprising:

including information about a first Walsh code of said at least two separate Walsh codes associated with said second channel in the first encoder packet; and transmitting the second encoder packet said second channel using the first Walsh code.

11. A method, as set forth in claim 10, further comprising:

receiving said first and second encoder packets at said receiver; and decoding said first encoder packet before decoding said second encoder packet.

12. A method, as set forth in claim 5, wherein transmitting said first channel further comprises:

transmitting said first channel and said second channel on orthogonal sub-sets of available bandwidth based on an orthogonal frequency division multiplexing protocol.

13. A method, as set forth in claim 12, further comprising:

causing said first channel and said second channel to use a different portion of the available bandwidth.

14. A method, as set forth in claim 13, further comprising:

transmitting said first channel and said second channel concurrently on different sub-sets of sub-carriers.

15. A method, as set forth in claim 14, further comprising:

providing information about a sub-carrier of said different sub-sets of sub-carriers being used to transmit said second channel in an encoder packet being carried by said first channel.

16. A method, as set forth in claim 5, further comprising:

enabling a transmitter to signal said variable structure on the fly to said receiver.

17. A method, as set forth in claim 5, further comprising:

tailoring a structure of the second encoder packet transmitted over said second channel based on information content to be transmitted on said second channel.

18. A method, as set forth in claim 17, further comprising:

enabling said transmitter to size the second encoder packet transmitted over said second channel based on said information content.

19. A method, as set forth in claim 18, further comprising:

sizing at least one control channel transmission resource based on said payload of link control information.

\* \* \* \* \*